March 1, 1955    C. D. JONES    2,703,011
BROODER THERMOMETER HOLDER
Filed Oct. 31, 1951
Fig. 1.
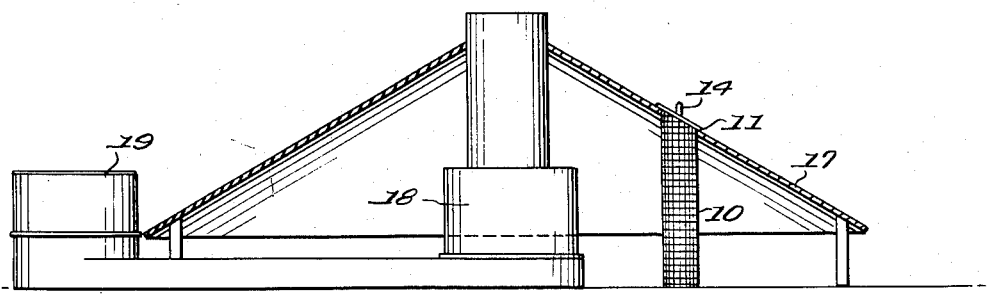
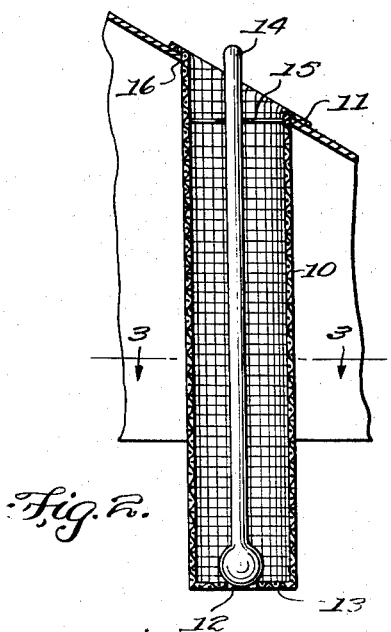
Fig. 2.
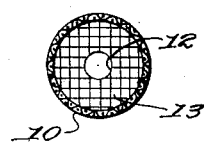
Fig. 3.
INVENTOR.
Carl D. Jones,
BY Victor J. Evans & Co.
ATTORNEYS

United States Patent Office 2,703,011
Patented Mar. 1, 1955

2,703,011

BROODER THERMOMETER HOLDER

Carl D. Jones, Jerome, Idaho

Application October 31, 1951, Serial No. 254,153

1 Claim. (Cl. 73—343)

This invention relates to brooders used for raising fowl and particularly chickens, turkeys, and the like, and in particular a vertically positioned wire mesh cylinder extended downwardly through a brooder cover whereby a thermometer inserted in the cylinder is subjected to the temperature of the brooder and at the same time protected from fowl therein.

The purpose of this invention is to provide a protecting shield for a brooder thermometer whereby it is impossible for fowl to raise the indicated temperature of the thermometer by crowding around the thermometer.

In the conventional type of brooder an elongated tubular thermometer is dropped through an opening in the hood or cover to determine the temperature on the interior of the brooder. With the thermometer positioned in this manner fowl crowd around the bulb thereof and the temperature at the bulb corresponds with the body temperature of the fowl, whereas the temperature in the interior of the brooder is comparatively low. With this thought in mind this invention contemplates a tubular wire mesh shield extended downwardly through an opening in a brooder cover whereby a thermometer positioned in the shield is spaced from fowl assembled around the outer surface of the shield.

The object of this invention is, therefore, to provide means for forming a thermometer holder for brooders and the like so that the thermometer is not influenced by the body temperature of fowl in the brooder.

Another object of the invention is to provide a thermometer holder for a brooder that may readily be installed in brooders now in use.

A further object of the invention is to provide a thermometer holder and protector for spacing the thermometer from fowl assembled in a brooder which is of a simple and economical construction.

With these and other objects and advantages in view the invention embodies a wire mesh cylindrical element having a flange around the upper end for mounting the device in a brooder and having means therein for spacing the thermometer from the wall thereof.

Other features and advantages of the invention will appear from the following description taken in connection with the drawings wherein:

Figure 1 is a longitudinal section through a brooder showing the thermometer protecting shield therein and showing the shield and heating element of the brooder in elevation.

Figure 2 is a vertical section on an enlarged scale through the thermometer protecting shield, showing a thermometer therein.

Figure 3 is a cross section taken on line 3—3 of Figure 2 showing the wire mesh thermometer shield with the thermometer omitted.

Referring now to the drawings wherein like reference characters denote corresponding parts the improved thermometer protecting shield of this invention includes a wire mesh cylinder 10 having a flange 11 around the upper end and having a thermometer locating opening 12 in a web extended across the lower end.

A thermometer as indicated by the numeral 14 may be positioned in the cylinder as illustrated in Figure 2 and spring arms 15, or other means may be provided on the thermometer or in the upper end of the shield for spacing the upper end of the thermometer from the walls of the shield.

The flange 11 on the upper end of the holder may be secured to the cover 17 of the brooder by welding or other suitable means, or the device may be freely positioned in the opening 16, as may be desired.

It will also be understood that other means may be used for locating the bulb or lower end of the thermometer in the lower end of the device.

With the parts formed in this manner the thermometer protector of this invention is inserted in an opening 16 in a hood or cover 17 of a brooder, which may be provided with a heater 18 and a supply container 19, and with the parts positioned as illustrated in the drawing chickens, turkeys, pheasants, or other fowl may crowd around the device without coming in contact with the bulb of the thermometer and, therefore, without raising the temperature indicated by the thermometer. By this means a comparatively accurate reading may be taken with the thermometer to indicate the temperature in the brooder.

It will be understood that although the device is shown and described as being made of wire mesh, it may be made of other suitable material wherein air in the brooder may circulate through the wall of the device or around a thermometer of the device.

It will be understood that other modifications may be made in the design and arrangement of the parts without departing from the spirit of the invention.

What is claimed is:

In a brooder used for raising fowl having a slanted roof provided with a circular opening therein, a vertically disposed thermometer extending through said opening down into the interior of the brooder, a thermometer protector including an elongated tubular casing fabricated of wire mesh and including a horizontally disposed bottom wall provided with an opening in the center thereof for receiving a portion of the bulb on the lower end of the thermometer, an enlarged annular flange on the upper end of said casing, said flange being of greater diameter than the opening in said roof and abutting the upper surface of the roof, said flange being inclined at the same angle as said roof, and a plurality of horizontally disposed spring arms extending inwardly from the side wall of the casing and engaging the thermometer, said arms being arranged adjacent the upper end of the casing for maintaining the upper part of the thermometer in spaced relation with respect to the side wall of the casing.

References Cited in the file of this patent

UNITED STATES PATENTS

| Number | Name | Date |
|---|---|---|
| 709,508 | Pedersen | Sept. 23, 1902 |
| 1,079,724 | Roberts | Nov. 25, 1913 |
| 1,081,139 | Parliman | Dec. 9, 1913 |
| 1,138,798 | Schramm | May 11, 1915 |

FOREIGN PATENTS

| Number | Country | Date |
|---|---|---|
| 26,321 | Sweden | May 15, 1917 |
| 114,144 | Sweden | June 5, 1945 |